Dec. 26, 1939.   A. LANGSNER   2,184,352
TELESCOPE
Original Filed Nov. 2, 1934
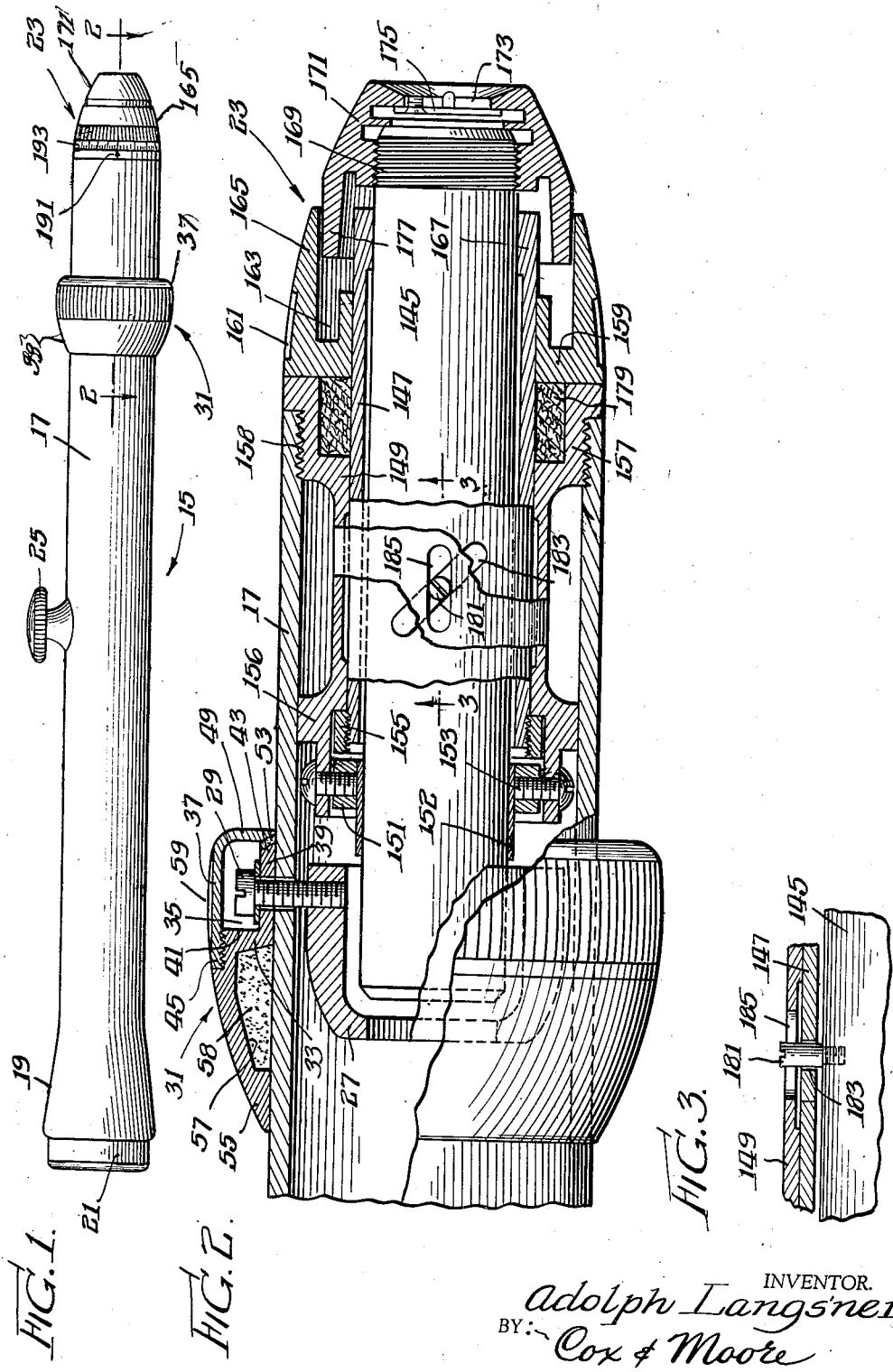
INVENTOR.
Adolph Langsner
BY: Cox & Moore
ATTORNEYS.

Patented Dec. 26, 1939

2,184,352

UNITED STATES PATENT OFFICE 2,184,352

TELESCOPE

Adolph Langsner, Chicago, Ill., assignor to Eugene Dietzgen Company, Chicago, Ill., a corporation of Delaware Original application November 2, 1934, Serial No. 751,242. Divided and this application February 4, 1938, Serial No. 188,595

2 Claims. (Cl. 88—32)

My invention relates in general to telescopes and has more particular reference to telescopes adapted for use in surveying instruments such as levels, transits, and the like, the present application comprising subject-matter divided from my copending application, Serial No. 751,242, filed November 2, 1934, which application has matured into Patent No. 2,126,335, Aug. 9, 1938.

An important object is to provide telescopes of improved streamlined appearance and of simplified construction whereby operation of the instrument is facilitated, the operating parts being designed to exclude dirt, moisture and other foreign matter from entering the same and causing deterioration.

Another important object is to improve the appearance of the telescope, as well as to reduce wind resistance offered by the exposed parts when the instrument is used in making precision measurements out-of-doors.

Another important object is to provide a telescope having an adjustable part therein and adjusting means accessible from outside of the telescope and operable to adjust the part within the telescope, including closure means for preventing entry of foreign matter into the casing of the telescope.

Another important object is to provide an instrument comprising a telescope having an improved eye-piece assembly giving a streamlined appearance to the end of the telescope and affording means to adjust said eye-piece while substantially preventing the entrance of foreign matter into the barrel.

Another important object is to provide in conjunction with the eye-piece an internal reticle and adjusting means for the reticle accessible from outside of the telescope, including a closure assembly comprising a frame and a removable cover carried by the frame for enclosing the reticle adjusting means.

Another important object is to provide an instrument comprising a telescope having focusing means shiftable within the barrel of the telescope and adjusting means accessible from outside of the barrel of the telescope for shifting the focusing means within the barrel and dust-proof means affording connection between said focusing and adjusting means.

Another important object is to provide a telescope having an eye-piece removable as a unit from the telescope to facilitate repairs and replacements.

Another important object resides in providing an eye-piece adjustable by rotating an exposed portion of the eye-piece assembly on the barrel of the telescope, while protecting the interior of the eye-piece against the entrance of foreign matter; a further object being to form a scale and a cooperating index mark on the exposed turnable portion of the eye-piece and on an adjacent portion stationary with the barrel of the telescope.

Numerous other objects and advantages of the invention will be apparent from the following description, which, taken in connection with the accompanying drawing, discloses preferred embodiments of the invention.

Referring to the drawing,

Figure 1 is a perspective view of a telescope embodying my present invention;

Figure 2 is an enlarged sectional view of the eye-piece end of the telescope, taken substantially along the line 2—2 in Figure 1; and Figure 3 is a sectional view taken substantially along the line 3—3 in Figure 2.

To illustrate my invention, I have shown, on the drawing, a telescope 15 of substantially streamlined appearance. The telescope in the illustrated embodiment comprises a tubular barrel 17 of preferably cylindrical configuration, which may be belled or enlarged at one end as at 19 to receive an objective lens assembly 21. The end of the telescope opposite from the objective lens assembly may be provided with an adjustable eye-piece assembly 23, the exposed portions of which are preferably shaped to a bullet nose configuration in order to improve the appearance of the telescope and reduce wind resistance. A laterally projecting manually operable knob 25 may also be provided upon the barrel of the telescope to enable adjustment of an objective focusing slide of any suitable or convenient form within the barrel of the telescope. Opposite the inner end of the eye-piece assembly 23 a cross-hair reticle 27 is arranged. This reticle comprises a part adjustable within the barrel of the telescope as by means of threaded adjusting screws 29 mounted radially on the reticle and extending through a circumferentially arranged series of openings in the wall of the barrel opposite the position occupied by the reticle therein.

The screws 29 have heads received in a closure assembly 31 carried on the barrel and comprising a frame 33 formed with an annular channel 35, in which the heads of the adjusting screws 29 are received. A removable cover 37, adapted for mounting on the frame in position to sealingly enclose the heads of the adjusting screws 29, is provided.

It is an important object of my present invention to prevent ingress of foreign matter into the interior of the barrel of the telescope at the openings through which the adjusting screws 29 extend, as well as at the adjustable eye-piece assembly and at the focusing knob. To this end, the frame 33 comprises an annular collar having inwardly facing surfaces snugly seated upon the exterior surface of the telescope and having portions extending on each side of the adjusting screw openings. The collar forming the frame 33 has portions 39 of reduced sectional thickness and provided with perforations in alignment with the perforations of the telescope barrel, through which the adjusting screws 29 extend. The frame 33, on at least one side of the perforated portion 39, is flanged to provide a shoulder 41 defining one side of the groove 35, and the portion 39 is extended as at 43 at the other side of the groove.

One or the other, or both of the spaced portions 41 and 43 of the frame may be threaded to receive correspondingly threaded portions 45 formed on the cover 37.

In the illustrated embodiment the portion 41 is threaded to receive a correspondingly threaded portion of the cover while the portion 43 of the frame provides an abutment for snugly engaging a flanged portion 49 of the cover when the same is secured on the frame. The flange 49 may be and preferably is of yielding character, so that as the cover is tightened on the frame, the flange 49 will exert a resilient wiping pressure upon the abutment 43 in order to seal the parts against the entrance of foreign matter therebetween into the space 35. I may also impose a sealing gasket 53 between the parts 43 and 49, if desired.

I prefer also to form the cover 37 and the frame 33 to provide a substantially streamlined appearance on the telescope when the parts are in closed position. To this end, the frame 33 has portions 55 extending along the barrel of the telescope away from the shouldered portion 41. The outer surfaces of the extension portion 55 are preferably curved, as shown, in order to impart a pleasing streamlined appearance. The inner surfaces of the portions 55 preferably snugly engage the barrel of the telescope at least at the terminal edge of the portion 55, although the portions 55 may be internally grooved or pocketed as at 57 in order to reduce weight and also to afford a space in which a sealing medium 58 may be assembled in order to prevent seepage of foreign matter along the barrel of the telescope within the sleeve-like frame 33. The outer peripheral surfaces of the cover 37 are preferably curved to continue the configuration of the outer portions of the surfaces 55 and also may be knurled as at 59 to facilitate attachment or removal of the same from mounted position on the frame 33.

The barrel 17 of the telescope carries focusing means comprising a shiftable element carrying a focusing lens within the barrel between the eye-piece and the objective cell 21. The shiftable element preferably comprises a sleeve mounted for longitudinal movement within the barrel, and focusing is accomplished by moving this sleeve in order to vary the spacement between the objective cell and the focusing lens carried by the sleeve. I provide suitable dust-proof means for shifting the focusing sleeve within the barrel of the telescope in response to manipulation of the knob 25 outside of the barrel.

The eye-piece assembly 23 comprises an adjustable element shown as a lens-carrying tube 145 slidable in a sleeve 147 in order to focus the eye-piece on the cross-hairs of the reticle 27. The sleeve 147, in turn, is supported in an annular sleeve-like support frame or collar 149. The lens-carrying tube or frame projects at its inner end beyond the sleeves 147 and 149, said inner end being supported in an adjustable collar 151 mounted at the inner end of the sleeve 149 by means of the adjusting screws 153, the sleeve being carried in the collar 151 by means of a split sleeve 152 of resilient material, which is carried by the collar in position to snugly receive the tube and hold the same centered in the collar while permitting axial movement of the same. The inner end of the sleeve 147 is threaded to receive a holding collar 155, which rests on a shoulder formed in the end of the outer sleeve 149. The sleeve 149 has an annular outstanding rib 156 adapted to snugly engage the interior of the barrel 17 to hold the assembly in aligned position and the sleeve 149 is threaded at its outer end 157 for engagement with the end of the telescope barrel, which is correspondingly threaded as at 158. The outer end of the sleeve 147 projects outwardly of the threaded end of the sleeve 149 and carries fixed thereon an annular manually-operable element 159, the surfaces of which are knurled as at 161 to facilitate manipulation of the same. Inwardly of said knurled surface, the element 129 is provided with an annular groove 163 defining an annular lip 165. The sleeve 147 extends within the member 159 to a point substantially opposite the lip 165 and is formed internally with an annular bead 167 snugly engaging the outer end of the lens tube 145 so that the same is supported by said bead and by the collar 151 at the other end of the assembly. The tubular lens element 145 projects at its outer end beyond the bead 167 and is threaded as at 169 to receive a cover 171 affording a peep hole 173 preferably provided with a manually operable shutter 175 opposite the outer end of the lens tube 145. The cover 171 has outer lateral surfaces formed to continue the configuration of the outer surfaces of the part 159, said eye-piece being formed with an annular flange 177 fitting into the groove 163 and snugly engaging within the lip 165 to provide for relative longitudinal movement between the parts 159 and 161 when the part 159 is rotated on the sleeve 149 while preventing the entrance of foreign matter into the assembly between the relatively slidable flanges 165 and 177. If desired, the space enclosed by the flanges may be filled with felt gaskets to catch any foreign matter entering therebetween and prevent the same from progressing between the sliding surfaces of the lens tube 145 and the support sleeve 147. The holding nut 155, of course, holds the member 159 snugly against the end of the member 149 but since the former is turned on the latter in adjusting the eye-piece, I may arrange a felt gasket in the annular space 179 to catch any foreign matter entering between the sliding surfaces of the parts.

To accomplish axial shifting of the lens tube 145 in response to rotation of the part 159, the tube carries a pin 181, which extends outwardly thereof through a slot 183 in the rotatable sleeve 147 and a slot 185 in the sleeve 149. The slot 185 is parallel with the axis of the tube 145 so that the same may slide axially but may not turn. The slot 183, however, is diagonal so that as the sleeve 147 is turned, the movement of its slotted portion will shift the pin back and forth in the slot 185 and thus cause the tube 145 to shift axially with respect to the frame 149.

If desired, the peripheral surface of the rotatable member 159 and the adjacent rim of the sleeve 149, which is stationary with the telescope barrel, may be formed with an index 191 and cooperating scale 193 adapted to indicate the adjustment of the eye-piece. The scale 193 is preferably on the rotatable head 159 while the index is on the rim of the sleeve element 157.

It will be seen from the foregoing that the eye-piece assembly may be attached on and removed from the telescope barrel as a unit; that the unit is dust-proof and that its exposed portions afford an attractive stream-lined appearance in the telescope. The reticle closure assembly affords means preventing foreign matter from entering the telescope barrel while at the same time furnishing an attractive streamline appearance on the telescope.

Finally, the assembly provides for substantially dust-proof operation of the internal mechanism from the exterior of the barrel, the exterior portions of the focusing assembly being of attractive streamlined appearance.

It is thought that the invention and numerous of its attendant advantages will be understood from the foregoing description, and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

The invention is hereby claimed as follows:

1. A telescope comprising a barrel, an annular support sleeve element sealed in said barrel, and sealed thereto at the end thereof, an adjusting sleeve element in said support element and having an end extending outwardly of the barrel, said adjusting element having a collar thereon at the end of the barrel in position to engage and form a running seal with said support sleeve element, said collar forming with said support sleeve element, an annular chamber at the end of the barrel, resilient packing means in said annular chamber to prevent the entrance of foreign matter into the barrel between said support and adjusting sleeves, and tubular lensed element supported within said adjusting sleeve element, and having an end projecting outwardly of said manually operable collar and carrying cover means, said cover means and collar having telescopically interfitted flanges forming a sliding seal therebetween to exclude foreign matter from entering therebetween and penetrating thence between the adjusting sleeve element and said lensed element, cooperating means on said lensed element, said support sleeve element and said adjusting sleeve element, and comprising a cam member on one of said elements, and intersecting slots in the other elements for receiving said cam means whereby to longitudinally move the lensed member with respect to the barrel when said adjusting sleeve is turned in the support sleeve as by manual operation of said collar.

2. A telescope as set forth in claim 1 wherein the cam means comprises a pin on the lensed element, said support sleeve element having a longitudinal slot formed therein, and said adjusting sleeve element having a helical slot, both slots receiving the pin in order to shift the lensed element longitudinally without turning the same when said adjusting sleeve is turned.

ADOLPH LANGSNER.